(12) United States Patent
Siriwardane et al.

(10) Patent No.: US 8,807,988 B2
(45) Date of Patent: Aug. 19, 2014

(54) REGENERABLE MGO PROMOTED METAL OXIDE OXYGEN CARRIERS FOR CHEMICAL LOOPING COMBUSTION

(75) Inventors: Ranjani V. Siriwardane, Morgantown, WV (US); Duane D. Miller, Fairmont, WV (US)

(73) Assignee: U.S. Department Of Energy, Washington, DC (US)

( * ) Notice: Subject to any disclaimer, the term of this patent is extended or adjusted under 35 U.S.C. 154(b) by 136 days.

(21) Appl. No.: 13/477,274

(22) Filed: May 22, 2012

(65) Prior Publication Data

US 2013/0316292 A1 Nov. 28, 2013

(51) Int. Cl.
*F23D 3/40* (2006.01)

(52) U.S. Cl.
USPC .............. 431/7; 252/182.33; 423/652

(58) Field of Classification Search
CPC ........... F23C 10/01; F23C 2900/99008; F23C 13/00–13/08
USPC .............. 431/7; 252/182.33; 423/652
See application file for complete search history.

(56) References Cited

U.S. PATENT DOCUMENTS

| | | | |
|---|---|---|---|
| 2,607,699 A | | 8/1952 | Corner et al. |
| 3,893,949 A | * | 7/1975 | Sakai et al. ................... 502/241 |
| 2005/0232859 A1 | * | 10/2005 | Sanfilippo et al. ............ 423/652 |

OTHER PUBLICATIONS

Johansson, Marcus et al., Investigation of Fe2O3 with MgAl2O4 for Chemical-Looping Combustion, Ind. Eng. Chem. Res. 2004, 43, 6978-6987.*
Jin et al., "Development of a Novel Chemical-Looping Combustion: Synthesis of a Solid Looping Material of NiO/NiAl2O4," Incl. Eng, Chem. Res. 38 (1999).

* cited by examiner

*Primary Examiner* — Kenneth Rinehart
*Assistant Examiner* — Gajanan M Prabhu
(74) *Attorney, Agent, or Firm* — James B. Potts; Brian J. Lally; John T. Lucas

(57) ABSTRACT

The disclosure provides an oxygen carrier comprised of a plurality of metal oxide particles in contact with a plurality of MgO promoter particles. The MgO promoter particles increase the reaction rate and oxygen utilization of the metal oxide when contacting with a gaseous hydrocarbon at a temperature greater than about 725° C. The promoted oxide solid is generally comprised of less than about 25 wt. % MgO, and may be prepared by physical mixing, incipient wetness impregnation, or other methods known in the art. The oxygen carrier exhibits a crystalline structure of the metal oxide and a crystalline structure of MgO under XRD crystallography, and retains these crystalline structures over subsequent redox cycles. In an embodiment, the metal oxide is $Fe_2O_3$, and the gaseous hydrocarbon is comprised of methane.

14 Claims, 6 Drawing Sheets

REGENERABLE MGO PROMOTED METAL OXIDE OXYGEN CARRIERS FOR CHEMICAL LOOPING COMBUSTION

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides an oxygen carrier for a chemical looping combustion process comprised of a plurality of metal oxide particles in contact with a plurality of MgO promoter particles. The oxygen carrier exhibits a crystalline structure of the metal oxide and a crystalline structure of MgO under XRD crystallography over numerous redox cycles. The MgO promoter particles increase the reaction rate and oxygen utilization of the metal oxide when contacting with a gaseous hydrocarbon at a temperature greater than about 725° C. In an embodiment, the metal oxide is $Fe_2O_3$ and the gaseous hydrocarbon is comprised of methane.

BACKGROUND

Applications are known where metal-oxide oxygen carriers are utilized for the delivery of oxygen via reduction of the oxygen carrier. One such application which has been investigated extensively is chemical looping combustion. Chemical looping combustion systems generally utilize a fuel reactor, an air reactor, and a metal oxide oxygen carrier undergoing reduction in the fuel reactor and oxidation in the air reactor. The reduction in the fuel reactor is facilitated by close contact between a fuel and the oxygen carrier. The subsequent oxidation of the carrier in the air reactor is an exothermic process and a stream of $N_2$ is exhausted from the air reactor and carries the heat of oxidation to an attached power generation island.

Chemical looping combustion cycles provide potentially significant advantages, enhanced reversibility of the two redox reactions offers improved efficiencies over traditional single stage combustions, where the release of a fuel's energy occurs in a highly irreversible manner. Further, with appropriate oxygen carriers, both redox reactions can occur at relatively low temperatures, allowing a power station to more closely approach an ideal work output without exposing components to excessive working temperatures. Additionally, and significantly, chemical looping combustion can serve as an effective carbon capture technique. Of the two flue gas streams generated, one is comprised of atmospheric $N_2$ and residual $O_2$, but sensibly free of $CO_2$, while the second stream is comprised of $CO_2$ and $H_2O$, and contains almost all of the $CO_2$ generated by the system. It is relatively uncomplicated to remove the water vapor, leading to a stream of almost pure $CO_2$. For these reasons, chemical looping combustion systems have been extensively investigated.

It is understood that high reactivity and oxygen utilization of the oxygen carrier is desired in chemical looping combustion systems in order to limit the solid inventories utilized in the various processes. Generally, the amount of the bed material in each reactor and the solid circulation rates between reactors mainly depends on the oxygen carrying capacity of the carriers. As a result, an important characteristic of a successful oxygen carrier is its reactivity in both reduction and oxidation cycles. To increase, reactivity, oxygen carrier particles are often prepared by depositing a metal oxide phase on an inert support such as $SiO_2$, $TiO_2$, $ZrO_2$, $Al_2O_3$, YSZ, bentonite, and others, in order to stabilize the metal loading and increase exposed surface area over repeated reduction-oxidation cycles.

Magnesium oxide (MgO) has additionally been utilized to foster the support of certain metal oxides such as $Fe_2O$. This has generally been conducted by sintering a $Fe_2O_3$/MgO mixture at temperatures exceeding about 1000° C. and stabilizing the oxide by generating $MgFe_2O_4$. See e.g., Jin et al., "Development of a Novel Chemical-Looping Combustion: Synthesis of a Solid Looping Material of $NiO/NiAl_2O_4$." *Ind. Eng. Chem. Res.* 38 (1999). Similarly magnesium has been utilized as a component in various supporting spinels. See e.g., Ryden et al. "$Fe_2O_3$ on Ce-, Ca- or Mg-Stabilized ZrO2 as Oxygen Carrier for Chemical-Looping Combustion Using NiO as Additive," *AIChE Journal*, Vol. 56, No. 8 (2010), and see Johansson et al., "Investigation of $Fe_2O_3$ with $MgAl_2O_4$ for Chemical-Looping Combustion," *Ind. Eng. Chem. Res.* 43 (2004), and see Adanez et al., "Progress in Chemical-Looping Combustion and Reforming technologies," *Prog. Energ. Combust.* 38 (2012). Generally speaking, in these oxygen carriers, MgO has been absent as a discrete component. In cases where MgO has been identified within the oxygen carrier, reduction temperature have been limited to a maximum of 700° C., and very slow or no reaction has been reported. See Jin et al., and see Adanez et al. MgO has additionally been utilized as a discrete component in conjunction with $Fe_2O_3$ and $MnO_2$ in order to enhance fluidization, however the resulting mixture exhibits CO selectivity on the order of 90%. See U.S. Pat. No. 2,607,699 to Corner et al., issued Aug. 19, 1952.

Disclosed here is an oxygen carrier comprised of a metal oxide and MgO promoter particles for the chemical looping combustion of a gaseous hydrocarbon at temperatures greater than about 725° C. The oxygen carrier maintains MgO as a discrete component over numerous redox cycles, and demonstrably improves the percentage combustion and oxygen utilization of the metal oxide. The MgO component does not function as a support material for increasing the surface area of the oxygen carrier. Additionally, the oxygen carrier generates $CO_2$ and $H_2O$ combustion gases with a substantial absence of CO and $H_2$. The effect is temperature dependent and is generally not observed at temperatures below about 700° C. In a particular embodiment, the metal oxide is $Fe_2O_3$, and MgO comprises between 5 weight % (wt. %) and 25 wt. % of the $Fe_2O_3$/MgO mixture.

The objects, aspects, and advantages of the present disclosure will become better understood with reference to the accompanying description and claims.

SUMMARY

The disclosure provides an oxygen carrier comprised of a promoted oxide solid, where the promoted oxide solid is comprised of a plurality of metal oxide particles in contact with a plurality of MgO promoter particles. The MgO promoter particles increase the reaction rate and oxygen utilization of the metal oxide when contacting with a gaseous hydrocarbon at a temperature greater than about 725° C. In an embodiment, the metal oxide is $Fe_2O_3$ and the gaseous hydrocarbon is comprised of methane.

The oxygen carrier may be utilized within a chemical combustion system having a fuel reactor and an oxidation reactor. The fuel reactor receives a flow of a gaseous hydrocarbon fuel and facilitates contact between the gaseous hydrocarbon fuel and the oxygen carrier at an appropriate temperature condition, reducing the metal oxide and generating $CO_2$ and $H_2O$. The reduced carrier may subsequently enter the oxidation reactor for subsequent oxidation. Following the oxidation, the regenerated metal oxide particles and the MgO promoter particles comprise a regenerated promoted oxide solid, which may be subsequently transported to the fuel reactor for use as the oxygen carrier in a cyclic operation. Within the cycle, the MgO promoter particles increase the reaction rate and oxygen utilization of the metal oxide, but otherwise act as an inert material with no significant oxygen release capability. The surface areas of MgO promoted carriers are generally low indicating that MgO does not act as a support which usually increases the surface area. Additionally, the promoted oxide solid exhibits a crystalline structure of both the metal oxide and MgO under XRD crystallography following the reduction-oxidation cycles.

The MgO promoter particles significantly increase the oxygen transfer of the metal oxide and greatly improve the reaction rate and percent of combustion of the gaseous hydrocarbon, as compared to the metal oxide acting alone. The addition of an inert material such as MgO can also increase the physical strength of the oxygen carrier. Thus, the addition of MgO promoter particles increases the methane reactivity and physical stability of the oxygen carrier and has a potential for use improving industrial oxygen carriers for the chemical looping combustion process.

Embodiments of the oxygen carrier disclosed are further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide an oxygen carrier exhibiting improved performance through the use of MgO promoter particles.

The disclosure provides an oxygen carrier comprised of a promoted oxide solid, where the promoted oxide solid is comprised of a plurality of metal oxide particles in contact with a plurality of MgO promoter particles. The MgO promoter particles increase the reaction rate and oxygen utilization of the metal oxide when contacting with a gaseous hydrocarbon at a temperature greater than about 725° C., and may be prepared by physical mixing, incipient wetness impregnation, or other methods known in the art for generating a plurality of metal oxide particles in contact with a plurality of MgO particles. The oxygen carrier exhibits a crystalline structure of the metal oxide and a crystalline structure of MgO under XRD crystallography, and retains these crystalline structures over subsequent redox cycles. The oxygen carrier may be utilized for the delivery of oxygen to a fuel reactor in a chemical looping combustion process, followed by subsequent oxidation of the reduced metal oxide using an oxidizing gas. In an embodiment, the metal oxide is $Fe_2O_3$ and the gaseous hydrocarbon is comprised of methane.

Figure 1:
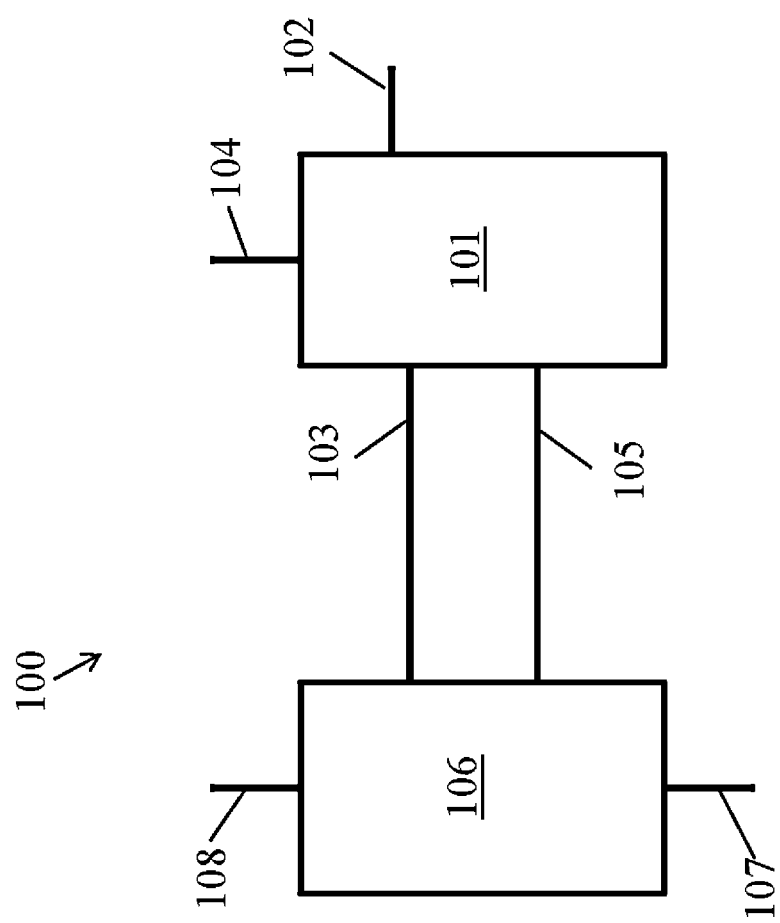
FIG. 1 illustrates a schematic of a chemical looping combustion system.

A chemical looping combustion system within which the oxygen carrier disclosed here may be utilized is illustrated at FIG. 1. FIG. 1 illustrates a chemical combustion system generally at 100 and includes fuel reactor 101. Fuel reactor 101 receives a flow of a gaseous hydrocarbon fuel at 102 and the oxygen carrier at 103, and facilitates contact between the gaseous hydrocarbon fuel and the oxygen carrier. Fuel reactor 101 further is maintained at a temperature sufficient to generate a combustion reaction as a result of the contact between the gaseous hydrocarbon and the oxygen carrier, generating $CO_2$ and $H_2O$ and reducing at least a portion of the oxygen carrier. Following the reduction and oxidation, combustion gases comprised of $CO_2$ and $H_2O$ with a substantial absence of CO and $H_2$ exit fuel reactor 101 at exhaust 104, and the reduced carrier exits fuel reactor 101 at 105.

The oxygen carrier entering fuel reactor 101 at 103 is comprised of a promoted oxide solid, where the promoted oxide solid is comprised of a plurality of metal oxide particles and a plurality of MgO promoter particles, as will be discussed. Under XRD crystallography, the oxygen carrier exhibits a crystalline structure of both the metal oxide and MgO. At least some portion of the plurality of metal oxide particles is in physical contact with the plurality of the MgO promoter particles. In an embodiment, the plurality of metal oxide particles comprise at least 50 weight percent of the promoted oxide solid. In addition, the oxygen carrier may be further comprised of an inert support in contact with the promoted oxide solid. With reference to FIG. 1, within fuel reactor 101, the promoted oxide solid comprising the oxygen carrier may be reduced from a generic MgO-$Me_xO_y$ composition to a reduced carrier having generic MgO-$Me_zO_{y-1}$ composition, where $Me_xO_y$ represents the metal oxide or combination of metal oxides and $Me_zO_{y-1}$ represents reduced metal oxide particles, and where MgO represents the MgO promoter particles. In an embodiment, the metal oxide is $Fe_2O_3$, CuO, NiO, $Mn_2O_3$, $Co_3O_4$, $CaSO_4$, MoO or mixtures thereof, and the reduced metal oxide particles are a reduced form of the respective metal oxides.

The reduced carrier exiting fuel reactor 101 at 105 may subsequently enter oxidation reactor 106. Oxidation reactor 106 further receives a flow of oxidizing gas such as air, and facilitates contact between the reduced carrier and the oxidizing gas. The temperature of oxidation reactor 106 in conjunction with oxygen contact is sufficient to oxidize the reduced metal oxide particles comprising the reduced carrier, producing regenerated metal oxide particles, where the regenerated metal oxide particles are oxidations of the reduced metal oxide particles. Following the oxidation, the regenerated metal oxide particles and the MgO promoter particles comprise a regenerated promoted oxide solid having the generic MgO-$Me_xO_y$ composition of the promoted oxide solid, and the regenerated promoted oxide solid comprises a regenerated oxygen carrier. The regenerated oxygen carrier may be subsequently transported to fuel reactor 101 at 103 for use as the oxygen carrier in a cyclic operation.

Additionally, as is understood, the oxidizing reaction occurring in oxidation reactor 106 may be an exothermic reaction, and heat generated may be carried from oxidizing reactor 106 by a gaseous flow exiting at 108, and may be sent to and utilized by a power generation cycle. Further, it is understood that FIG. 1 provides an exemplary application illustrating a chemical looping combustion process with the oxygen carrier, however this is not intended to be limiting. Within this disclosure, it is only necessary that an oxygen carrier comprised of a promoted oxide solid, where the promoted oxide solid is comprised of a plurality of metal oxide particles in contact with a plurality of MgO promoter particles, be contacted with a heated gaseous hydrocarbon at a temperature greater than about 725° C., producing combustion gases and a reduced carrier, where the combustion gases are comprised of $CO_2$ and $H_2O$ and where the combustion gases have a substantial absence of CO and $H_2$, and where the reduced carrier is comprised of a plurality of reduced metal oxide particles and the plurality of MgO promoter particles, and where the reduced metal oxide particles are a reduction product of the metal oxide particles.

Within this disclosure, "metal oxide particles" means particles comprised of a compound consisting of a transition metal cation bounded with at least one oxygen atom anion or any material active for CLC reaction. Similarly, "reduced metal oxide particles" means a reduced form of the metal oxides particles, such that "reduced metal oxide particles" means either: (1) particles comprised of a compound consisting of the transition metal cation of the metal oxide particles bounded with at least one oxygen atom anion, where the ratio of the oxygen atom anion to the transition metal cation in the reduced metal oxide particles is less than the ratio of the oxygen atom anion to the transition metal cation in the metal oxide particles or (2) particles comprised of the transition metal comprising the metal oxide particles. Such metal oxide particle—reduced metal oxide particle redox systems commonly used for the transfer of oxygen are known in the art. See e.g, Adanez et al., "Progress in Chemical-Looping Combustion and Reforming technologies," *Prog. Energ. Combust.* 38 (2012), among others. In an embodiment, the metal oxide particles are comprised of $Fe_2O_3$, CuO, NiO, $Mn_2O_3$, $Co_3O_4$, $CaSO_4$, MoO and mixtures thereof, and the respective reduced metal oxide particles are comprised of $Fe_3O_4$ and FeO, Cu, Ni, $Mn_3O_4$, CoO, and mixtures thereof. In a particular embodiment, the metal oxide particles are comprised of $Fe_2O_3$ and the reduced metal oxide particles are comprised of $Fe_3O_4$. In addition, $CaSO_4$ may also be used in place of metal oxides.

Within this disclosure, "MgO promoter particles" means particles comprised of MgO, for example, magnesia or dolomite. In an embodiment, MgO promoter particles are present in the promoted oxide solid such that the promoted oxide solid is comprised of at least 1 wt. % MgO. In another embodiment, MgO promoter particles are present in the promoted oxide solid such that the promoted oxide solid is comprised of less than or equal to about 25 wt. % MgO.

Within this disclosure, "substantial absence of CO and $H_2$" in the combustion gases means that the combustion gases are comprised of less than 1.0 volume percent (vol %) CO and $H_2$.

Within this disclosure, "reducing" or "reduction" as it applies to a metal oxide particle means the loss of oxygen from the metal oxide particle resulting in the formation of a reduced metal oxide particle. For example, the reduction of a generic $Me_xO_y$ composition to a generic $Me_zO_{y-1}$ composition. Similarly, a "reduction product" means a chemical composition resulting from the reduction of a metal oxide particle.

Within this disclosure, "oxidizing" or "oxidation" as it applies to a reduced metal oxide particle means the gain of oxygen by the reduced metal oxide particle resulting in the formation of a metal oxide particle. For example, the oxidation of a generic $Me_zO_{y-1}$ composition to a generic $Me_xO_y$ composition. Similarly, an "oxidation product" means a chemical composition resulting from the oxidation of reduced metal oxide particles.

Within this disclosure, "oxygen carrier" means a solid comprised of a promoted oxide solid, where the promoted oxide solid is comprised of a plurality of metal oxide particles and a plurality of MgO promoter particles, where at least some portion of the plurality of metal oxide particles is in physical contact with at least some portion of the MgO promoter particles. Similarly, a "reduced carrier" means a solid comprised of a plurality of reduced metal oxide particles and the plurality of MgO promoter particles, where the plurality of reduced metal oxide particles are a reduction product of the plurality of metal oxide particles.

Within this disclosure, "regenerated metal oxide particles" means an oxidation product of a plurality of reduced metal oxide particles, and "regenerated promoted oxide solid" means a solid comprised of a plurality of regenerated metal oxide particles and a plurality of MgO promoter particles. Similarly, a "regenerated oxygen carrier" means a solid comprised of the regenerated promoted oxide solid.

Figure 2:
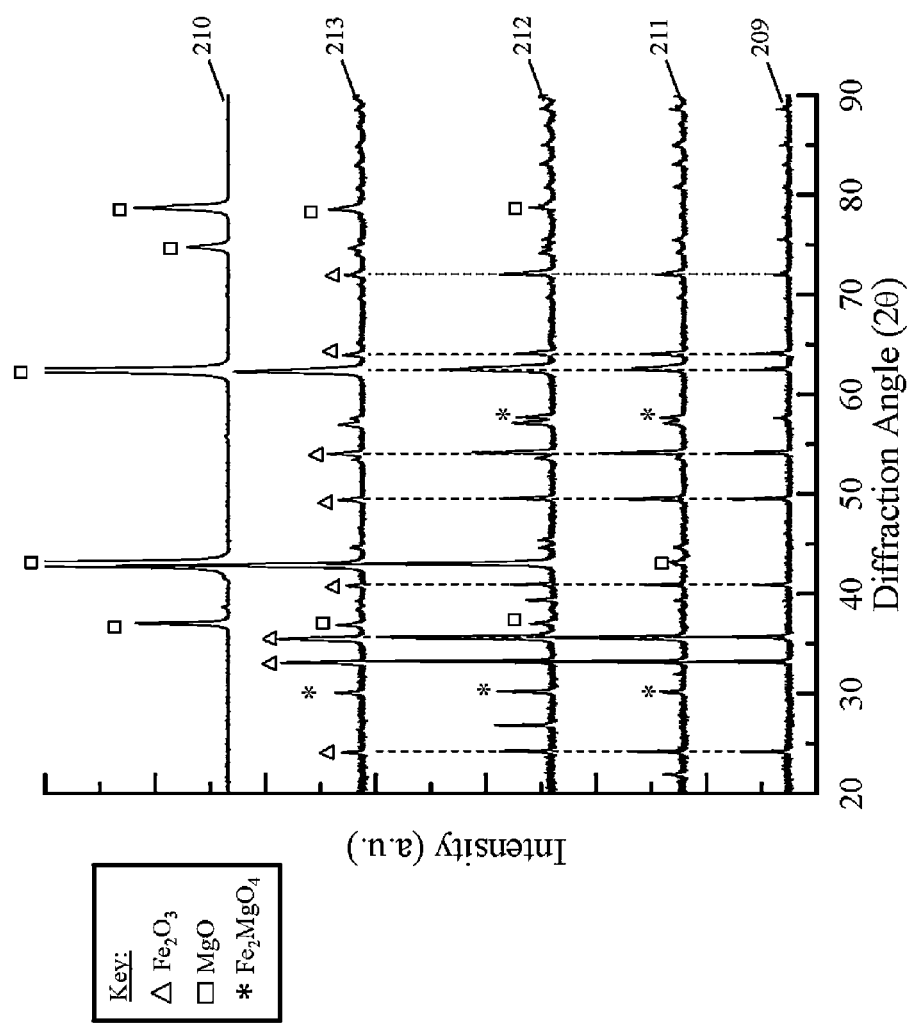
FIG. 2 illustrates XRD crystallography of a particular embodiment of the oxygen carrier.

As discussed, the oxygen carrier is comprised of a promoted oxide solid, where the promoted oxide solid is comprised of a plurality of metal oxide particles and a plurality of MgO promoter particles, where the oxygen carrier exhibits a crystalline structure of both the metal oxide and MgO under XRD crystallography following the reduction-oxidation cycles described above. As an example, FIG. 2 indicates a series of XRD traces for an embodiment where the metal oxide particle is $Fe_2O_3$, and following 15 reduction-oxidation cycles using methane at approximately 800° C. as the gaseous hydrocarbon. At FIG. 2, trace 211 represents an oxygen carrier comprised of 5 wt. % MgO, trace 212 represents an oxygen carrier comprised of 10 wt. % MgO, and trace 213 represents an oxygen carrier comprised of 25 wt. % MgO, where XRD peaks are labeled in accordance with the accompanying symbol key. As indicated at traces 211, 212, and 213, crystalline structures at the respective $Fe_2O_3$ and MgO 2-theta (2Θ) values indicate the presence of both $Fe_2O_3$ and MgO following the 15 cycles. For reference, FIG. 2 additionally illustrates an XRD trace of a $Fe_2O_3$ sample without the MgO promoter present at trace 209, and an XRD trace of an MgO promoter comprised of MgO and without $Fe_2O_3$ present at trace 210. Additionally, FIG. 2 indicates the formation of only a very small amount of $MgFe_2O_4$ under the reduction-oxidation conditions utilized, but a majority remains as MgO and $Fe_2O_3$.

The MgO promoter particles are an inert material with no significant oxygen release capability under the conditions of this disclosure. Without being bound by theory, it is believed that the MgO promoter particles participate in the catalytic decomposition of the gaseous hydrocarbon and significantly improve the rate of combustion, thereby improving the oxidation ability of the metal oxide particles comprising the oxygen carrier. This improvement is achieved by the catalytic decomposition of methane producing carbon, carbon monoxide, and hydrogen, which oxidize over the metal oxide to generate $CO_2$ and $H_2O$.

As an example, when the metal oxide of the oxygen carrier is $Fe_2O_3$ and the gaseous hydrocarbon is $CH_4$, the main reactions on the metal oxide $Fe_2O_3$ when the oxygen carrier and the gaseous hydrocarbon are contacted at the temperatures of this disclosure are:

$$12Fe_2O_3 + CH_4 \rightarrow CO_2 + 8Fe_3O_4 + 2H_2O$$

$$8Fe_2O_3 + CH_4 \rightarrow CO_2 + FeO + H_2O$$

However, in addition, the MgO promoter particles of the oxygen carrier provides catalytic decomposition of the methane and promotes concurrent carbon and hydrogen formation, which further oxidize over the $Fe_2O_3$:

$$CH_4 \rightarrow C + 2H_2 \text{ (catalyzed by MgO)}$$

$$2C + 12Fe_2O_3 \rightarrow 2CO_2 + 8Fe_3O_4$$

$$C + 2Fe_2O_3 \rightarrow CO_2 + 4Fe_3O_4$$

$$4H_2 + 12Fe_2O_3 \rightarrow 4H_2O + 8Fe_3O_4$$

$$H_2 + 2Fe_2O_3 \rightarrow H_2O + 4FeO$$

The presence of the MgO promoter particles in the promoted oxide solid of this disclosure significantly increases the oxygen transfer of the metal oxide and greatly improves the reaction rate and percent of combustion of the gaseous hydrocarbon, as compared to the metal oxide carrier acting alone. The addition of an inert material such as MgO can also increase the physical strength of the oxygen carrier. Thus, the addition of MgO promoter particles increases the methane reactivity and physical stability of the oxygen carrier and has a potential for use improving industrial oxygen carriers for the chemical looping combustion process.

Proof of Principle

An oxygen carrier comprised of a promoted oxide solid containing $Fe_2O_3$ and MgO was evaluated over fifteen cycle TGA combustion performance of oxygen carriers prepared by the various preparation methods with 20% methane, balance He at 800° C. The addition of MgO-containing materials to $Fe_2O_3$ increased the methane reactivity and physical stability of the oxygen carrier, and the presence of MgO indicated a strong improvement in combustion over a pure $Fe_2O_3$ species alone.

Oxygen Carrier Preparation:

Magnesium hydroxide ($Mg(OH)_2$) and $Fe_2O_3$ (Hematite) were commercially obtained from Sigma-Aldrich Co. LLC, St. Louis, Mo. Dolomite ($CaMg(CO_3)_2$) was commercially obtained from Alfa Aesar, Ward Hill, Mass. The oxygen carriers were prepared using several methods:

Physical mixing: Samples were prepared by physical mixing the solids using a mortar and pestle. MgO-containing materials with MgO weight loadings of 5, 10, and 25% were physically mixed with $Fe_2O_3$ and then calcined at 850° C. in air for 3 hours. The calcined material was then crushed to 35 mesh (500 micron) particle size.

Incipient wetness impregnation: A concentration of nitrates of magnesium were mixed and dissolved in deionized water for 5% MgO weight loading on the $Fe_2O_3$. The solution was then added drop wise to the $Fe_2O_3$ and maintained at 60° C. while stirring. The resulting paste was dried at 60° C. for 2 hr and calcined at 850° C. in air for 3 hours. The calcined samples were then crushed to 35 mesh (500 micron) particle size.

Thermogravimetric Analysis (TGA) Test Method:

TGA was conducted in a thermogravimetric analyzer (TA Model 2050) to investigate the redox properties of the mixed oxygen carriers. Approximately 100 mg of sample was placed in a 5-mm-deep, 10-mm-diameter crucible. The oxide mixture was heated in a quartz-bowl to 800 or 900° C. at a heating rate of 10° C./min in $N_2$ gas and a flow rate of 100 sccm. The sample was then maintained isothermal for the duration of the redox cycles. The reduction cycle consisted of 20% $CH_4$ balance nitrogen at 100 sccm, the oxidation cycle consists of air at 100 sccm. The sample was purged in 100 sccm $N_2$ between each reduction and oxygen cycle to prevent mixing of methane and air.

The fractional reduction and oxidation was calculated using the TGA data defined as: Fractional Reduction (X)= $(M_o-M)/(M_o-M_f)$, where M is the instantaneous weight of metal oxide, $M_o$ is the initial weight of the metal oxide, and $M_f$ is the weight of metal oxide following reaction. The global rates of reactions (dX/dt) were calculated by differentiating the fractional conversions (X).

Lab-Scale Flow Reactor Test Method:

Fixed-Bed lab-scale reactor studies were carried out using a Micromeritics AutochemHP lab-scale quartz reactor. Approximately 1.0 g of sample was placed in the stainless steel reactor coupled with a Pfeiffer Mass Spectrometer (MS). The reactor effluent was monitored continuously for the MS responses corresponding to $CH_4$ (m/z=16), $H_2O$ (m/z=18) and $CO_2$ (m/z=44). The inlet flow of 100% He was maintained at a total flow rate of 60 cm$^3$/min over the oxygen carriers at 101.3 kPa while heating from 25 to 800° C. at a heating rate of 10° C./min. The sample was then maintained isothermal for the duration of the redox cycles. The reduction cycle consisted of 20% $CH_4$ balance He at 60 sccm, while the oxidation cycle consisted of air at 60 sccm. The sample was purged in 60 sccm He between each reduction and oxygen cycle to prevent mixing of methane and air.

Results of the Fifteen Cycle TGA Tests for the CLC Reaction on 5%, 10%, and 25% Dolomite/MgO—$Fe_2O_3$ (hematite) Oxygen Carriers:

Fifteen cycle TGA combustion performance of oxygen carriers prepared by the various preparation methods with 20% methane are summarized in Table 1. Data for cycles 2, 8, and 15 are reported. The oxygen carrier preparation method is indicated as applicable by Note (a) and Note (b). Percent combustion (% Comb.) was based on the moles of $CH_4$ introduced to the lab scale reactor compared to the moles of $CO_2$ produced, and the global reaction rate (Rate) indicates the rate of conversion of moles $CH_4$ to moles $CO_2$ per minute.

Pure unsupported $Fe_2O_3$ showed a percentage combustion of 15.0% on cycle 2 and a global reaction rate of 0.31 min$^{-1}$, and the global reaction rate remained fairly constant during the 15 reduction cycles. The combustion percentage of $Fe_2O_3$ from 15.0% (cycle 2) to 19.9% (cycle 15) may possibly be the result of the changing surface area of the oxygen carrier. The MgO and dolomite, though theoretically un-reactive for the CLC combustion reaction, show very low (approximately 6%) combustion of methane.

The addition of 5% MgO to $Fe_2O_3$ by the incipient wetness impregnation method increased the combustion percentage of $Fe_2O_3$ from 15.0% to 35.4% and the global reaction rate from 0.31 min$^{-1}$ to 1.43 min$^{-1}$ on cycle 2. The combustion percentage (35.4-40.0%) and global rate (1.43-1.34 min$^{-1}$) remained relatively constant through the 15 cycle tests. For the samples prepared by physical mixing of the 5% wt $Mg(OH)_2$ and $Fe_2O_3$ the combustion percentage (28.9%) was similar to that of the carrier prepared by the impregnation method (35.4) but there was a slight increase in reaction rate from 1.43 min$^{-1}$ to 1.69 min$^{-1}$.

Increasing the amount of MgO loading on the $Fe_2O_3$ (cycle 2 data) resulted in an increase in combustion percentage from 35.4% (5% loading) to 40.6% (25% loading). The overall trend in Table 1 shows that increasing the amount of MgO-containing material increases the % oxygen transport capacity significantly. The addition of the MgO-containing materials result in significantly higher global reaction rates than that of the pure unsupported $Fe_2O_3$ oxygen carrier even after 15 redox cycles.

The raw dolomite material contains 54.4% $CaCO_3$ and 45.4% $MgCO_3$. Calcination of the dolomite material at 850° C. removes the $CO_2$ component of dolomite producing 54.4% CaO and 45.6% MgO which was then mixed at 5, 10, and 25 wt % with Hematite. According to Table 1, The TGA data of the pure calcined dolomite indicates that dolomite alone is un-reactive for CLC combustion. Addition of 5 wt % dolomite to $Fe_2O_3$ (hematite) caused an increase in combustion percentage from 15.0% (pure $Fe_2O_3$) to 31.6% and increased the global reaction rate from 0.31 to 1.37 $min^{-1}$. Similar to the MgO/$Fe_2O_3$ oxygen carriers, the dolomite/$Fe_2O_3$ oxygen carrier exhibited a significant increase in the global reaction rate by the addition of dolomite and the rate remained relatively stable on increasing number of reduction/oxidation cycles. The combustion percentage also remained relatively stable during the cyclic tests. Examining Table 1, a global trend appears over all of the MgO/$Fe_2O_3$ oxygen carriers: The combustion percentage increases on an increasing number of reduction cycles similar to that of the pure $Fe_2O_3$ material. This is consistent with the inert materials promoting carbon formation and the oxidation to $CO_2$ occurring by the reaction of carbon and $Fe_2O_3$ oxygen carrier.

Results of Fifteen Cycle Tests in the Lab Scale Reactor.

Figure 3:
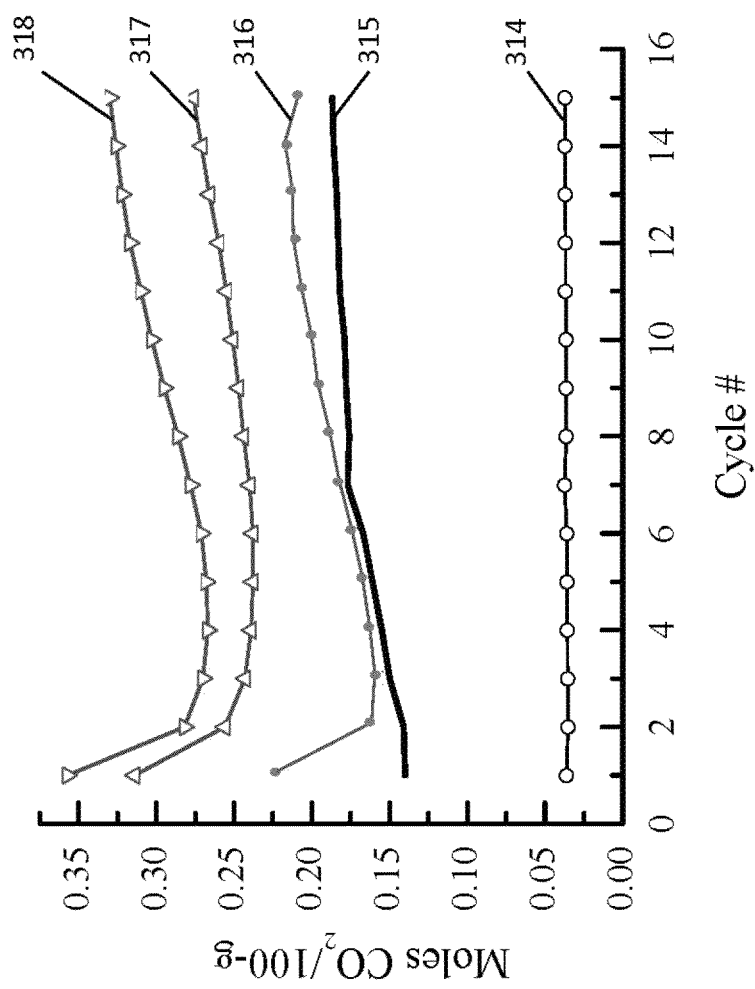
FIG. 3 illustrates moles $CO_2$ generated by a first embodiment of the oxygen carrier for various MgO loadings.

FIG. 3 illustrates moles $CO_2$ produced per 100 grams of oxygen carrier (moles $CO_2$/100-g) over 15 cycles at 800° C. for dolomite/$Fe_2O_3$ oxygen carriers prepared by physical mixing. At FIG. 3, curve 315 represents the performance of pure unsupported $Fe_2O_3$, and curve 314 represents the performance of 100% dolomite. Curve 316 represents the performance of an oxygen carrier comprised of 5% dolomite, balance hematite, curve 317 represents the performance of an oxygen carrier comprised of 10% dolomite, balance hematite, and curve 318 represents the performance of an oxygen carrier comprised of 25% dolomite, balance hematite. As illustrated, the addition of MgO comprising the dolomite to the $Fe_2O_3$ significantly increases the $CO_2$ production, and the reaction performance is stable for methane combustion. Further, no agglomeration of the oxygen carriers was observed after the 15 cycle tests. Additionally, the surface area of the pure unsupported $Fe_2O_3$ and the oxygen carriers was within the range 0.1551-0.2451 $m^2$/g, indicating that the enhancement illustrated at FIG. 3 is not due to a surface area effect.

Figure 4:
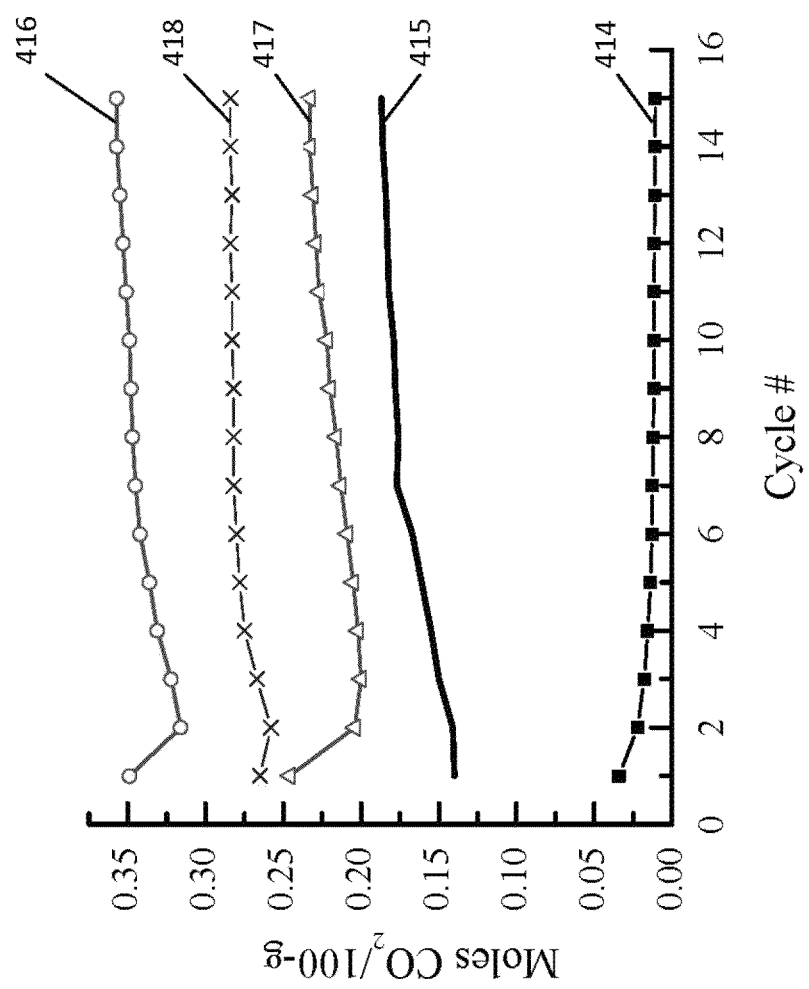
FIG. 4 illustrates moles $CO_2$ generated by a second embodiment of the oxygen carrier for various MgO loadings.

FIG. 4 illustrates moles $CO_2$/100-g over 15 cycles at 800° C. for MgO/$Fe_2O_3$ oxygen carriers prepared by incipient wetness impregnation. Curve 415 represents the performance of pure unsupported $Fe_2O_3$, and curve 414 represents the performance of 100% MgO. Curve 416 represents the performance of an oxygen carrier comprised of 5% MgO (nitrate), balance hematite, curve 417 represents the performance of an oxygen carrier comprised of 10% MgO (nitrate), balance hematite, and curve 418 represents the performance of an oxygen carrier comprised of 25% MgO (nitrate), balance hematite. The data clearly shows the performance enhancement due to MgO. The surface area of the pure unsupported $Fe_2O_3$ and the oxygen carriers was within the range 0.1551-0.3933 $m_2$/g, indicating that the enhancement illustrated at FIG. 3 is not due to a surface area effect.

Figure 5:
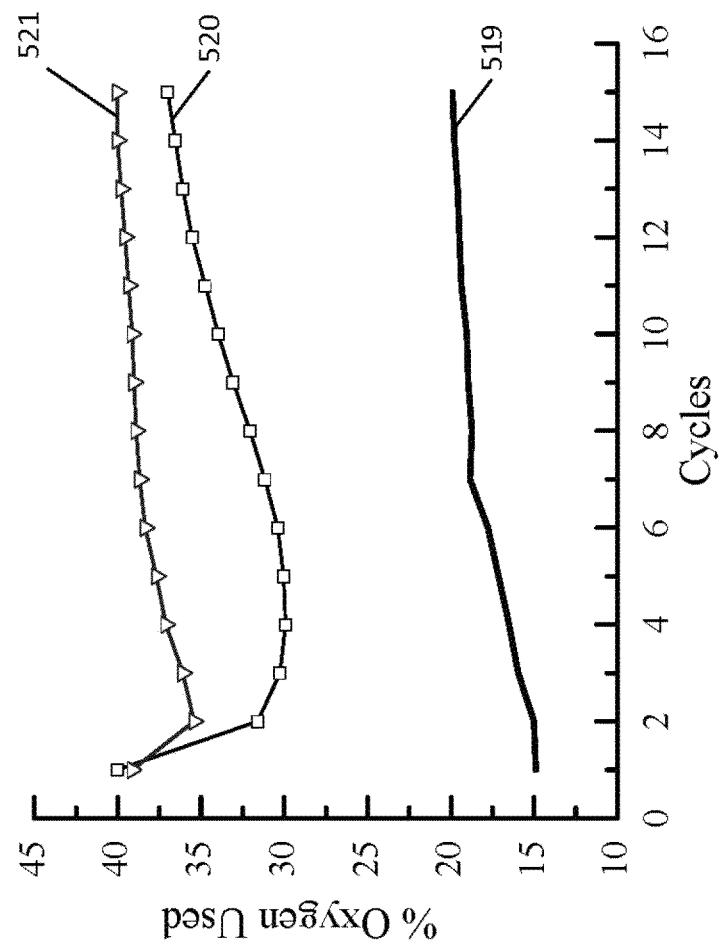
FIG. 5 illustrates % oxygen used for several embodiments of the oxygen carrier.

FIG. 5 illustrates a % Oxygen used, based on the moles of oxygen in the $CO_2$ produced divided by the theoretical amount of $O_2$ available in the $Fe_2O_3$ present. Curve 519 represents the % Oxygen used of pure unsupported $Fe_2O_3$, while curve 520 represents the % Oxygen used of the oxygen carrier comprised of 5% dolomite, balance hematite prepared by physical mixing, and curve 521 represents the % Oxygen of the oxygen carrier comprised of 5% MgO (nitrate), balance hematite prepared by incipient wetness impregnation. FIG. 5 indicates that MgO significantly improves the combustion efficiency of the $Fe_2O_3$, and indicates that the reaction performance enhancing effect of the MgO-containing materials has a potential for promoting industrial oxygen carriers for use in the chemical looping combustion process.

Figure 6:
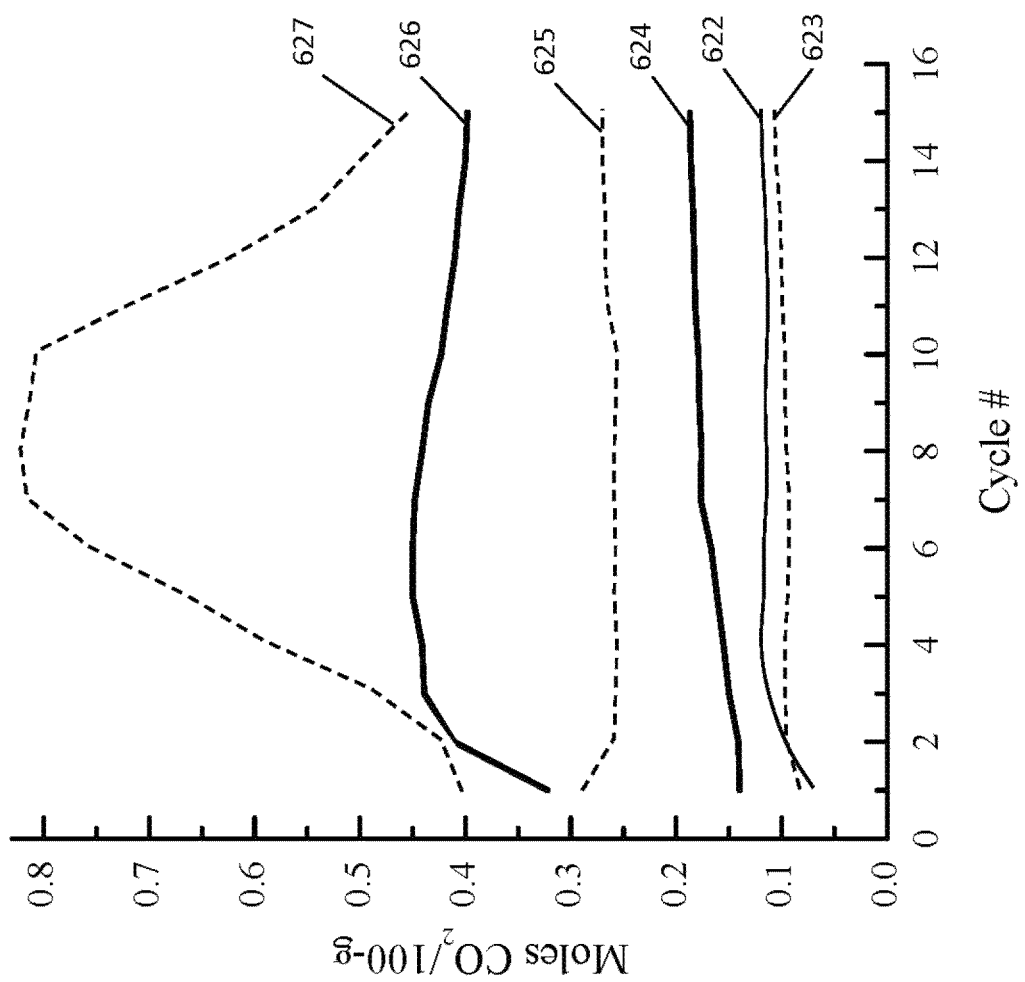
FIG. 6 illustrates the effect of temperature on a particular embodiment of the oxygen carrier.

FIG. 6 illustrates the results of fifteen cycle TGA combustion performance of an oxygen carrier comprised of 5% MgO, balance $Fe_2O_3$, compared to pure, unsupported $Fe_2O_3$ at several temperatures, and indicates the impact of temperature on the reaction performance enhancing effect. Curves 622 and 623 correspond to a redox cycle temperature of 700° C., where curve 622 indicates moles $CO_2$/100-g generated over pure, unsupported $Fe_2O_3$ while curve 623 indicates moles $CO_2$/100-g generated over a 5% MgO, balance $Fe_2O_3$ oxygen carrier. Similarly, curves 624 and 625 correspond to a redox cycle temperature of 800° C., where curve 624 indicates moles $CO_2$/100-g generated over pure, unsupported $Fe_2O_3$ while curve 625 indicates moles $CO_2$/100-g generated over a 5% MgO, balance $Fe_2O_3$ oxygen carrier. Additionally, Curves 626 and 627 correspond to a redox cycle temperature of 900° C., where curve 626 indicates moles $CO_2$/100-g generated over pure, unsupported $Fe_2O_3$ while curve 627 indicates moles $CO_2$/100-g generated over a 5% MgO, balance $Fe_2O_3$ oxygen carrier. As indicated by FIG. 6, available oxygen increases on increasing temperature, with a low temperature limit generally around 725° C. At 900° C. MgO contributes to the best performance, and reduction of $Fe_2O_3$ to Fe was observed. However, formation of Fe metal may have contributed to agglomeration as indicated by a decrease in capacity during fifteen cycles. Better design of the oxygen carrier may be necessary to avoid agglomeration at 900° C. to maintain the high performance.

Thus, the disclosure herein provides an oxygen carrier comprised of a promoted oxide solid, where the promoted oxide solid is comprised of a plurality of metal oxide particles in contact with a plurality of MgO promoter particles. The MgO promoter particles increase the reaction rate and oxygen utilization of the metal oxide when contacting with a gaseous hydrocarbon at a temperature greater than about 725° C. The promoted oxide solid is generally comprised of between 5 wt. % and 25 wt. % MgO, and may be prepared by physical mixing, incipient wetness impregnation, or other methods known in the art for generating a plurality of metal oxide particles in contact with a plurality of MgO particles. The oxygen carrier exhibits a crystalline structure of the metal oxide and a crystalline structure of MgO under XRD crystallography, and retains these crystalline structures over subsequent redox cycles. In an embodiment, the metal oxide is $Fe_2O_3$ and the gaseous hydrocarbon is comprised of methane.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Combustion Reaction performance with the addition of MgO and dolomite to $Fe_2O_3$

| Oxygen Carrier | Cycle 2 | | Cycle 8 | | Cycle 15 | |
|---|---|---|---|---|---|---|
| | % Comb. | Rate (min$^{-1}$) | % Comb. | Rate (min$^{-1}$) | % Comb. | Rate (min$^{-1}$) |
| $Fe_2O_3$ | 15.0 | 0.31 | 18.7 | 0.32 | 19.9 | 0.32 |
| MgO | 1.8 | — | 1.0 | — | 0.9 | — |
| Dolomite | 5.8 | — | 6.0 | — | 6.1 | — |
| 5% MgO/$Fe_2O_3$ (a) | 35.4 | 1.43 | 38.9 | 1.39 | 40 | 1.34 |
| 5% MgO/$Fe_2O_3$ (b) | 28.9 | 1.69 | 28.9 | 1.07 | 30.4 | 0.98 |
| 10% MgO/$Fe_2O_3$ (b) | 30.3 | 1.29 | 28.9 | 1.15 | 32.7 | 1.05 |
| 25% MgO/$Fe_2O_3$ (b) | 40.6 | 1.31 | 39.5 | 1.18 | 39.9 | 1.07 |
| 5% Dolomite/$Fe_2O_3$ (b) | 31.6 | 1.37 | 32.1 | 1.57 | 37 | 1.48 |
| 10% Dolomite/$Fe_2O_3$ (b) | 30.3 | 1.62 | 28.9 | 1.3 | 32.7 | 1.19 |
| 25% Dolomite/$Fe_2O_3$ (b) | 23 | 1.65 | 26.8 | 1.21 | 29.7 | 1.13 |

Note
(a) Incipient wetness impregnation preparation

Note
(b) Physical mixing preparation

What is claimed is:

1. A method of combusting a gaseous hydrocarbon comprising:

establishing the gaseous hydrocarbon at a temperature greater than 725° C., thereby generating a heated gaseous hydrocarbon; and contacting the heated gaseous hydrocarbon and an oxygen carrier, where the oxygen carrier is comprised of a promoted oxide solid, where the promoted oxide solid is comprised of a plurality of metal oxide particles and a plurality of MgO promoter particles, where the plurality of metal oxide particles comprise at least 50 weight percent of the promoted oxide solid, and where at least some portion of the plurality of metal oxide particles is in physical contact with at least some portion of the MgO promoter particles, thereby producing combustion gases and a reduced carrier, where the combustion gases are comprised of $CO_2$ and $H_2O$ and where the combustion gases have a substantial absence of CO and $H_2$, and where the reduced carrier is comprised of a plurality of reduced metal oxide particles and the plurality of MgO promoter particles, where the plurality of reduced metal oxide particles are a reduction product of the plurality of metal oxide particles, thereby combusting the gaseous hydrocarbon.

2. The method of claim 1 further comprised of:

separating the reduced carrier and the heated gaseous hydrocarbon and the combustion gases; and exposing the reduced carrier to an oxidizing gas comprised of $O_2$, thereby oxidizing a portion of the plurality of reduced metal oxide particles, and thereby producing a plurality of regenerated metal oxide particles, where the plurality of regenerated metal oxide particles is an oxidation product of the plurality of reduced metal oxide particles, and thereby producing a regenerated promoted oxide solid, where the regenerated promoted oxide solid is comprised of the plurality of regenerated metal oxide particles and the plurality of MgO promoter particles, and thereby producing a regenerated oxygen carrier, where the regenerated oxygen carrier is comprised of the regenerated promoted oxide solid.

3. The method of claim 1 where the gaseous hydrocarbon is comprised of methane.

4. The method of claim 1 where the plurality of MgO promoter particles are present in the promoted oxide solid such that the promoted oxide solid is comprised of less than or equal to about 25 weight percent MgO.

5. The method of claim 1 where the oxygen carrier is further comprised of a plurality of promoted oxide solids in contact with a binder.

6. A method of combusting the gaseous hydrocarbon using the method of claim 2 further comprised of:

maintaining a fuel reactor at a temperature greater than about 725° C., and flowing a gaseous stream into the fuel reactor, where the gaseous stream is comprised of the gaseous hydrocarbon, thereby establishing the gaseous hydrocarbon at a temperature greater than about 725° C. and thereby generating a heated gaseous hydrocarbon;

delivering the oxygen carrier to the fuel reactor;

mixing the heated gaseous hydrocarbon and the oxygen carrier in the fuel reactor, thereby contacting the heated gaseous hydrocarbon and the oxygen carrier, and thereby producing the combustion gases and the reduced carrier;

withdrawing the combustion gases from the fuel reactor;

transferring the reduced carrier to a reducing reactor, thereby separating the reduced carrier and the heated gaseous hydrocarbon and the combustion gases;

imparting the oxidizing gas to the reducing reactor and mixing the oxidizing gas and the reduced carrier, thereby exposing the reduced carrier to the oxidizing gas, and thereby producing the plurality of regenerated metal oxide particles, and thereby producing the regenerated promoted oxide solid, and thereby producing the regenerated oxygen carrier;

transporting the regenerated oxygen carrier to the fuel reactor and repeating the mixing, withdrawing, transferring, and imparting steps using the regenerated oxygen carrier as the oxygen carrier.

7. The method of claim 2 where the oxygen carrier exhibits a crystalline structure of the metal oxide and a crystalline structure of MgO under XRD crystallography.

8. The method of claim 7 where the metal oxide is $Fe_2O_3$, CuO, NiO, $Mn_2O_3$, $Co_3O_4$, $CaSO_4$, MoO or mixtures thereof.

9. A method of combusting a gaseous hydrocarbon comprising:

maintaining a fuel reactor at a temperature greater than about 725° C.;

flowing a gaseous stream into the fuel reactor, where the gaseous stream is comprised of the gaseous hydrocarbon, and heating the gaseous hydrocarbon to a temperature greater than about 725° C., thereby generating a heated gaseous hydrocarbon;

delivering an oxygen carrier into the fuel reactor, where the oxygen carrier is comprised of a promoted oxide solid, where the promoted oxide solid is comprised of a plurality of metal oxide particles and a plurality of MgO promoter particles, where the plurality of metal oxide particles comprise at least 50 weight percent of the promoted oxide solid, and where the plurality of MgO promoter particles are present in the promoted oxide solid such that the promoted oxide solid is comprised of less than or equal to about 25 weight percent MgO, and where at least some portion of the plurality of metal oxide particles is in physical contact with at least some portion of the MgO promoter particles;

contacting the heated gaseous hydrocarbon and the oxygen carrier in the fuel reactor, thereby producing combustion gases and a reduced carrier, where the combustion gases are comprised of $CO_2$ and $H_2O$ and where the combustion gases have a substantial absence of CO and $H_2$, and where the reduced carrier is comprised of a plurality of reduced metal oxide particles and the plurality of MgO promoter particles, where the plurality of reduced metal oxide particles are a reduction product of the plurality of metal oxide particles;

withdrawing the combustion gases from the fuel reactor;

transferring the reduced carrier to a reducing reactor;

imparting an oxidizing gas comprised of $O_2$ to the reducing reactor and exposing the reduced carrier to the oxidizing gas, thereby oxidizing a portion of the plurality of reduced metal oxide particles, and thereby producing a plurality of regenerated metal oxide particles, where the plurality of regenerated metal oxide particles is an oxidation product of the plurality of reduced metal oxide particles, and thereby producing a regenerated promoted oxide solid, where the regenerated promoted oxide solid is comprised of the plurality of regenerated metal oxide particles and the plurality of MgO promoter particles, and thereby producing a regenerated oxygen carrier, where the regenerated oxygen carrier is comprised of the regenerated promoted oxide solid; and transporting the regenerated oxygen carrier to the fuel reactor and repeating the contacting, withdrawing, and imparting steps using the regenerated oxygen carrier as the oxygen carrier.

10. The method of claim 9 where the oxygen carrier exhibits a crystalline structure of the metal oxide and a crystalline structure of MgO under XRD crystallography.

11. The method of claim 10 where the metal oxide is $Fe_2O_3$, CuO, NiO, $Mn_2O_3$, $Co_3O_4$, $CaSO_4$, MoO or mixtures thereof.

12. The method of claim 11 where the oxidizing gas is air.

13. The method of claim 12 where the gaseous hydrocarbon is comprised of methane.

14. The method of claim 12 where the metal oxide is $Fe_2O_3$.

* * * * *